United States Patent
Kelley (10) Patent No.: US 9,950,766 B2
(45) Date of Patent: Apr. 24, 2018

(54) PEDAL POSITIONING APPARATUS AND METHOD OF USE

(71) Applicant: Ryan Kelley, Frisco, TX (US)

(72) Inventor: Ryan Kelley, Frisco, TX (US)

(*) Notice: Subject to any disclaimer, the term of this patent is extended or adjusted under 35 U.S.C. 154(b) by 0 days.

(21) Appl. No.: 14/868,957

(22) Filed: Sep. 29, 2015

(65) Prior Publication Data

US 2016/0016637 A1    Jan. 21, 2016

Related U.S. Application Data

(63) Continuation-in-part of application No. 13/199,013, filed on Aug. 17, 2011, now Pat. No. 9,145,187.

(51) Int. Cl.
*B62M 3/08* (2006.01)
*B62M 3/16* (2006.01)

(52) U.S. Cl.
CPC .......... *B62M 3/16* (2013.01); *Y10T 29/49817* (2015.01); *Y10T 74/2168* (2015.01)

(58) Field of Classification Search
CPC . B62M 3/08; B62M 3/10; B62M 3/12; B62M 3/083; B62M 3/086; B62M 3/16
See application file for complete search history.

(56) References Cited

U.S. PATENT DOCUMENTS

| | | |
|---|---|---|
| 516,996 A | 3/1884 | Baenziger |
| 574,658 A * | 1/1897 | Bliven .................... B62M 3/08 74/594.5 |
| 614,856 A | 11/1898 | Gerow |
| 654,245 A | 7/1900 | Glasser |
| 1,393,256 A | 10/1921 | Wright |
| 1,834,296 A | 12/1931 | Talke et al. |
| 3,009,348 A | 11/1961 | Colbert et al. |
| 3,788,163 A | 1/1974 | Gause et al. |
| 4,103,563 A | 8/1978 | Genzling |
| 4,815,333 A | 3/1989 | Sampson |
| 5,078,026 A | 1/1992 | Giffin |
| 5,203,827 A | 4/1993 | Nestrud |
| 6,237,929 B1 | 5/2001 | Kielland |
| 1,230,129 A1 | 6/2017 | D' Artoys et al. |
| 2009/0308195 A1 | 12/2009 | Appleman |

FOREIGN PATENT DOCUMENTS

DE        3708460        1/1988

* cited by examiner

*Primary Examiner* — Thomas C Diaz
(74) *Attorney, Agent, or Firm* — Schultz & Associates, P.C.

(57) ABSTRACT

A removable pedal positioner to engage a crank arm and a pedal of a bicycle to position the pedal in a generally horizontal position. One embodiment comprises a bridge, at least one prong, and a mounting post. The mounting post engages the crank arm while the at least one prong extends past the crank arm to position the pedal in a generally horizontal position. In other embodiments, the positioner utilizes a flexible clamp to secure the positioner to the crank arm thereby positioning the pedal in a generally horizontal position. Upon rotation of the pedal, the device disengages from the crank arm.

14 Claims, 12 Drawing Sheets

PEDAL POSITIONING APPARATUS AND METHOD OF USE

CROSS REFERENCE TO RELATED APPLICATION

This application is a continuation in part of U.S. application Ser. No. 13/199,013 filed Aug. 17, 2011. The patent application identified above is incorporated herein by reference in its entirety to provide continuity of disclosure.

TECHNICAL FIELD OF THE INVENTION

This disclosure relates to an apparatus for temporarily preventing the rotation of a rotatable object. More specifically, this disclosure relates to a removable pedal positioning device for use in conjunction with bicycle pedals.

BACKGROUND OF THE INVENTION

In the prior art, various devices have been designed and produced for balancing the position of a bicycle pedal. However, many suffer from significant problems requiring the use of either counterweights or additional attachments to the bicycle pedal or the bicycle crank arm to position the pedal. In one typical prior art approach, counterweights are attached to the pedal to balance the pedal in a horizontal position. In another prior art approach, devices are attached to either the crank arm or the pedal to orient the pedal in a horizontal position. Both of these approaches add to the overall weight of the bicycle, thereby adding to the overall weight that a user has to propel, requiring the use of greater muscular force. When used in a racing context, use of these prior art approaches ultimately results in a decreased performance. Further, all of the prior art approaches must remain on the bicycle when in use and are not removable.

For example, U.S. Pat. No. 1,230,129 to D'Artoys, et al., discloses an adjustable vertical balancing device for the pedals of bicycles with or without toe clips, the purpose of which is to maintain as far as possible the pedals in a horizontal position. A plate is secured to the rear bar of the pedal with bolts. The plate is bent at a right angle where a first part is attached to the pedal, and a second part has lead weights affixed to it. This device requires adding weights, increases the overall bicycle weight, and must remain attached when in use.

U.S. Pat. No. 1,393,256 to Wright discloses a means for automatically adjusting the pedals of a bicycle in the proper position to receive the feet of a rider mounting the machine. Unequal weights are clipped to the underside of both pedals so that one pedal is always purposefully at the lowest point in the rotation of the crank. This device requires adding weight to the bicycle. Further, a user must dismount and manually detach the weights.

U.S. Pat. No. 1,834,296 to Talke, et al., discloses an attachment for cycle pedals for the purpose of maintaining the pedals in a horizontal position, as well as for distributing the wear and tear uniformly between both faces of the pedal tread. A spiral spring-clamp attaches a weight under the axle sleeve of the pedal. This device requires adding weights to position a pedal and must remain on the pedal when in use.

U.S. Pat. No. 4,103,563 to Genzling discloses a method and structure for orienting a bicycle pedal. A magnet attached to the pedal is attracted to a magnet mounted on the crank arm. The pedal is automatically oriented in a substantially horizontal position at least when the rotary crank has turned through 90° beyond its top dead center position. This device requires the use of magnets to position a pedal and must remain on the bicycle when in use.

U.S. Pat. No. 5,078,026 to Giffin discloses a bicycle pedal orientation device, which can be integrally formed with the pedal itself or removably attached to the pedal with bolts. The orientation device includes a cam comprised of a release lever and a latch arm. The latch arm includes a pawl, which releasably engages detents in the engaging mechanism. When engaged, the pedal is oriented in a horizontal position. Applying pressure to the lever by the foot of a rider causes the latch arm to disengage, and thus the pedal is free to rotate as usual throughout the duration of the bicycle use. This device must be either bolted to a pedal or built into the pedal when manufactured. This device remains on the pedal when in use.

U.S. Pat. No. 5,203,827 to Nestrud discloses a counter-weighted pedal. A counterweighting body is attached to the underside of the pedal through the use of clamps. The counterweighting body orients the pedal in a preferred horizontal position. This device requires a special pedal, relies on adding weights, and must remain on the pedal when in use.

The prior art fails to disclose or suggest a removable device for positioning a bicycle pedal. Therefore, it is desirable to have a device for positioning a bicycle pedal that is automatically removable and does not add to the overall weight of the bicycle when in use.

SUMMARY OF THE INVENTION

The inventor hereby discloses a removable attachment for a bicycle pedal that positions the pedal to a desired orientation irrespective of the current position of a crank arm.

One embodiment comprises a bridge, at least one prong extending from the bridge, a mounting post extending from the bridge, and a pin. The mounting post frictionally engages a hole in a fastener which fastens the pedal to the crank arm. The pin may be inserted into the mounting post, expanding the mounting post to further secure the mounting post in the hole in the fastener. At least one prong extends past the crank arm adjacent the pedal to position the pedal in a generally horizontal position. The mounting post in one embodiment has a multifurcated, generally frustoconical shape and is adapted to receive the pin.

In another embodiment, the mounting post is shaped to generally match a hole in a fastener. In this embodiment, the mounting post frictionally engages the hole in the fastener to mount the positioner without the pin. When in use, the positioner disengages the hole in the fastener and falls from the crank arm.

In another embodiment, the positioner comprises a first flexible clamp, a second flexible clamp, a first prong, a second prong, a first extension, and a second extension. In this embodiment, the clamps surround the crank arm of the bicycle. The first and second prongs extend out from the first and second extensions in a direction generally parallel to the pedal axis to support the pedal in a generally horizontal position. First and second extensions extend generally vertically from the first flexible clamp and attach to the second flexible clamp.

In another embodiment, the positioner comprises a flexible clamp, a prong bridge, a first prong, and a second prong. In this embodiment, the flexible clamp surrounds a bushing connecting the pedal to the crank arm. The prong bridge is attached to the flexible clamp and the first and second prongs extend out from the prong bridge in a direction generally parallel to the pedal axis to support the pedal in a generally horizontal position.

Each of the aforementioned embodiments can be modified to comprise a range of prongs, from a single prong to a plurality of prongs.

Each of the aforementioned embodiments can incorporate a prong constructed to fracture when in use to achieve a disposable solution to pedal positioning.

Each of the aforementioned embodiments can be constructed to detach from the pedal to achieve a reusable solution to pedal positioning.

BRIEF DESCRIPTION OF THE DRAWINGS

The disclosed embodiments will be described with reference to the accompanying drawings. Like pieces in different drawings carry the same number.

DETAILED DESCRIPTION

Figure 1:
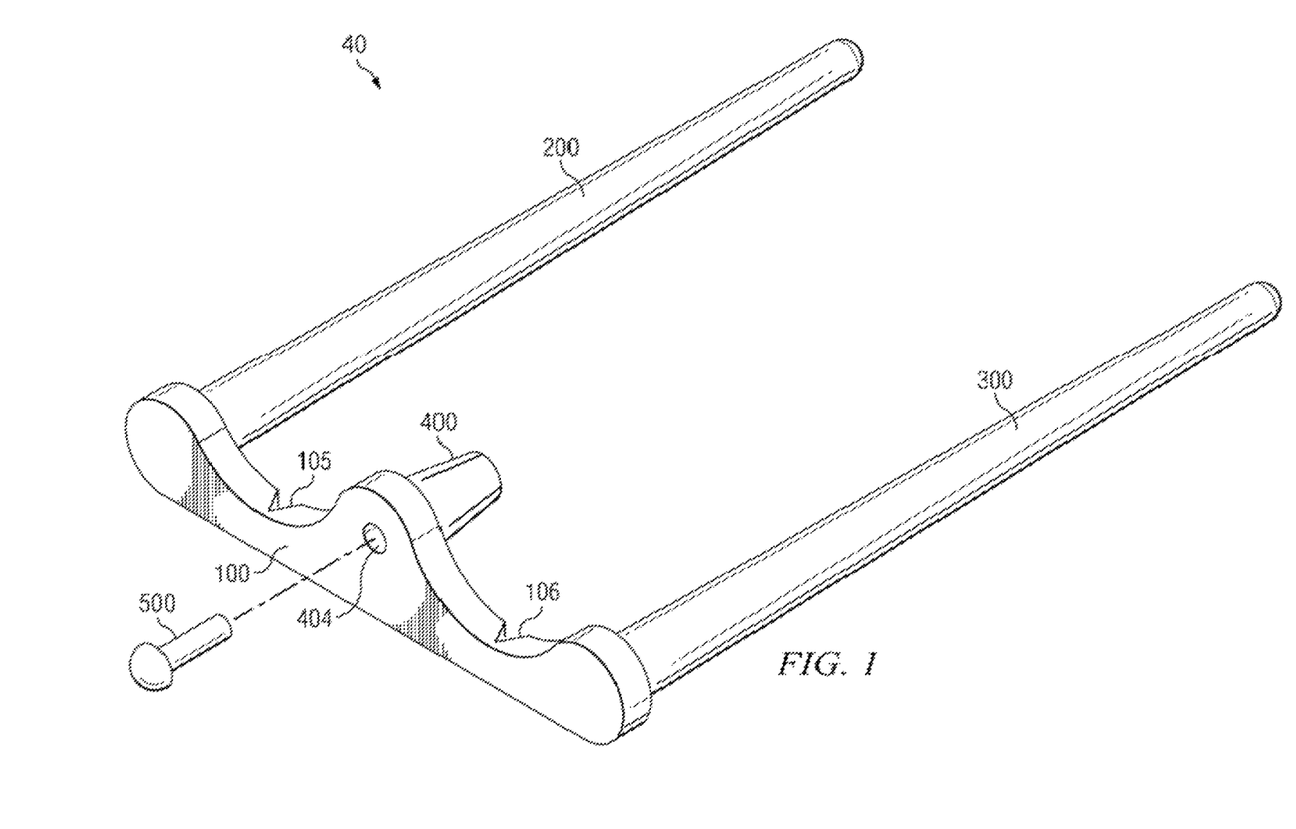
FIG. 1 is a perspective view of a preferred embodiment.

Referring to FIG. 1, bridge 100 is connected to prong 200 and prong 300 and mounting post 400. Prong 200 and prong 300 both extend generally perpendicularly from bridge 100. Mounting post 400 includes hole 404 and extends generally perpendicularly from bridge 100. Pin 500 is sized to engage hole 404.

Figure 2:
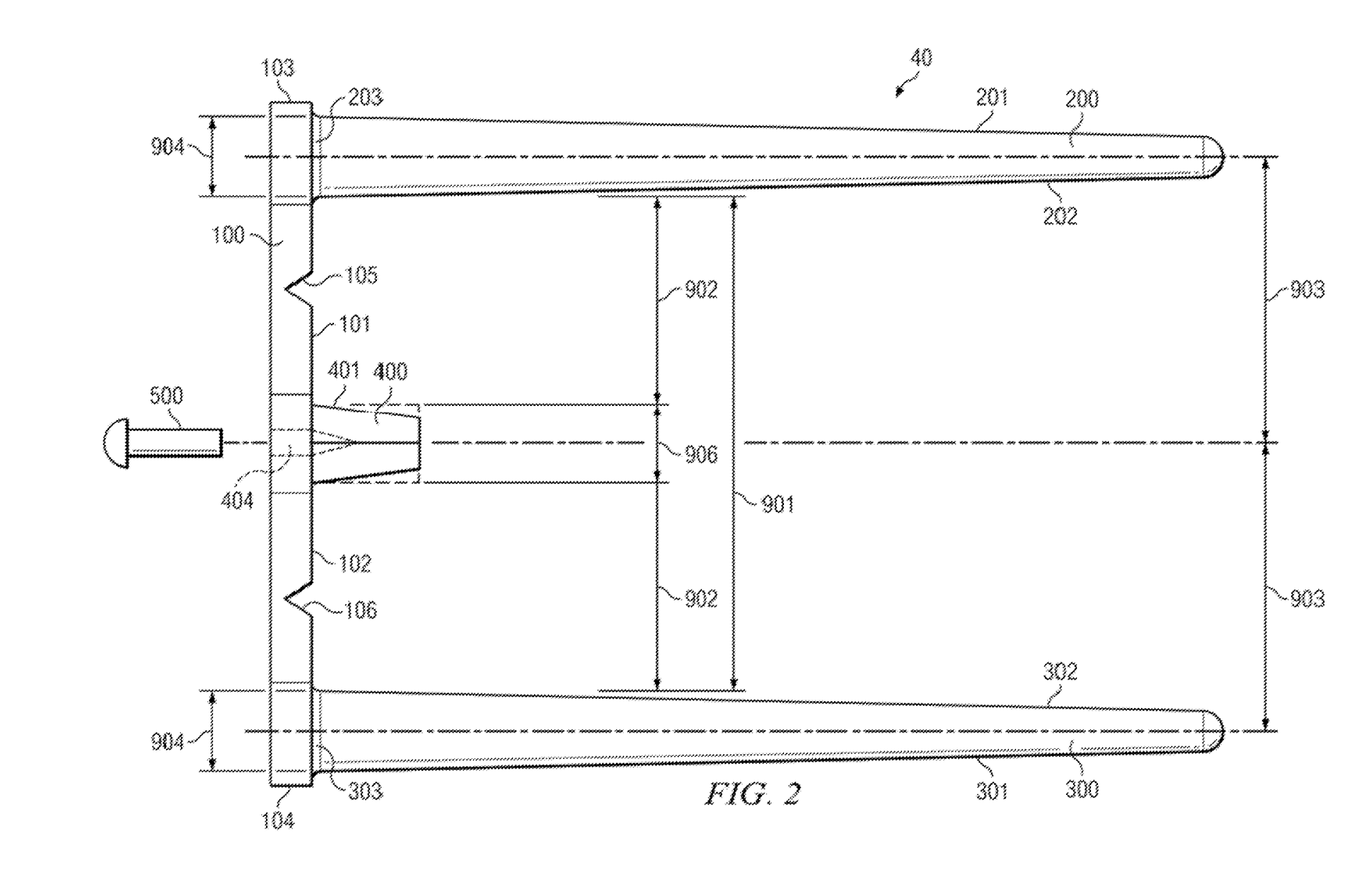
FIG. 2 is a top view of a preferred embodiment.
Figure 3:
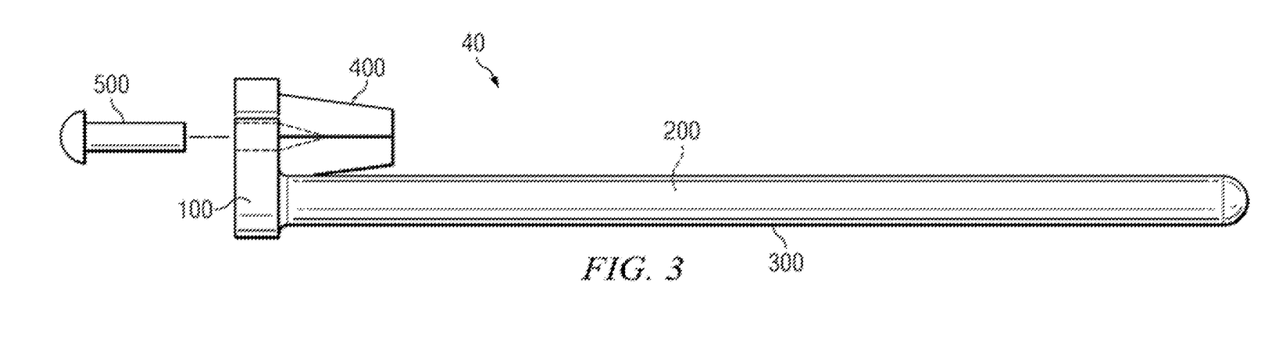
FIG. 3 is a side view of a preferred embodiment.

Referring to FIGS. 2 and 3, prong 200 has outside surface 201, inside surface 202, and base 203. Prong 300 has outside surface 301, inside surface 302, and base 303. Bridge 100 has inside surface 101, which separates prong 200 and mounting post 400. Bridge 100 has inside surf ace 102, which separates prong 300 and mounting post 400. Bridge 100 has first end 103 and second end 104 notch 105, and notch 106. Mounting post 400 has outside surface 401.

Mourning post 400 has width 906 that is sufficient to insert into a hole in a fastener in a crank arm. Mounting post 400 has a generally frustoconical shape, has hole 404, which is adapted to receive pin 500. Inside surface 202 of prong 200 and inside surface 302 of prong 300 are separated by distance 901. Distance 901 is greater than the typical width of a common in the art crank an. Inside surface 202 of prong 200 and mounting post 400 are separated by distance 902. Mounting post 400 and inside surface 302 of prong 300 are separated by distance 902. Distance 902 is approximately equal on either side of mounting post 400 to position mounting post 400 centrally between prong 200 and prong 300. The central axis of prong 200 and the central axis of mounting post 400 are separated by distance 903. The central axis of mounting post 400 and the central axis of prong 300 are also separated by distance 903. Distance 903 is approximately equal between prong 200 and mounting post 400 and between prong 300 and mounting post 400 to position centrally mounting post 400 between prong 200 and prong 300.

In one embodiment, bases 203 and 303 are constructed to each have width 904 that is sufficient to allow prongs 200 and 300 in conjunction with notch 105 and notch 106 to be severed from mounting post 400 during use. In this embodiment, pin 500 is inserted into hole 404 to expand generally frustoconical mounting post 400 to frictionally secure positioner 40 to a hole in a fastener.

Figure 4:
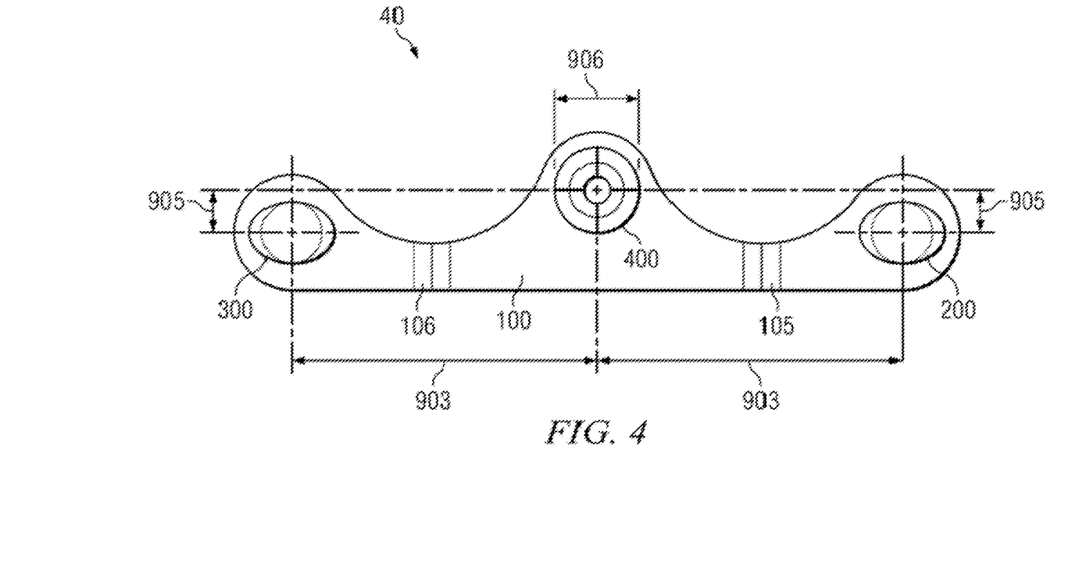
FIG. 4 is an end view of a preferred embodiment.

Referring to FIG. 4, bridge 100 is connected to prong 200, prong 300, and mounting post 400. Mounting post 400 has width 906. Width 906 is sufficient to engage with a hole in a fastener in a crank arm. The central axes of prong 300 and prong 200 are each at approximately equal distance 903 from the central axis of mounting post 400, thereby centrally positioning mounting post 400 between prong 200 and prong 300. The central axis of mounting post 400 is at vertical distance 905 from the central axis of prong 300 and prong 200. Distance 905 allows prong 200 and prong 300 to position a pedal while mounting post 400 is engaged with a hole in a fastener.

Figure 5A:
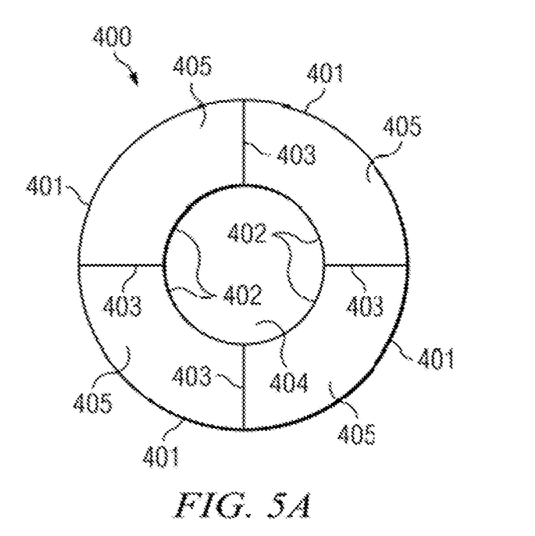
FIG. 5A is an end view of a mounting post.

Referring to FIG. 5A, mounting post 400 has a generally frustoconical shape and is divided into multifurcated sections 405. Mounting post 400 has outside surface 401, inside surface 402, and a plurality of spaces 403. Inside surface 402 forms hole 404. Spaces 403 allow mounting post 400 to be expanded when pin 500 is inserted into hole 404.

Figure 5B:
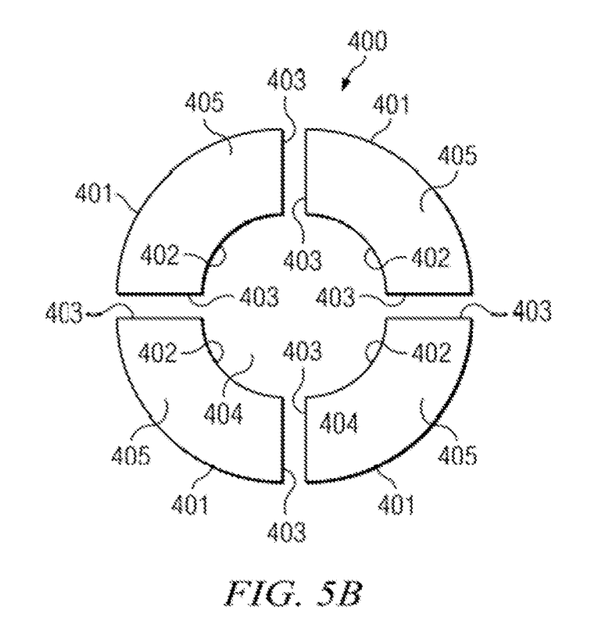
FIG. 5B is an end view of an expanded mounting post.

Referring to FIG. 5B, mounting post 400 is expanded from pin 500 being inserted into hole 404. Pin 500 forces multifurcated sections 405 of mounting post 400 to expand by pushing against inside surface 402 of mounting post 400. Spaces 403 are expanded and engage a hole of a fastener via outside surface 401.

Figure 6:
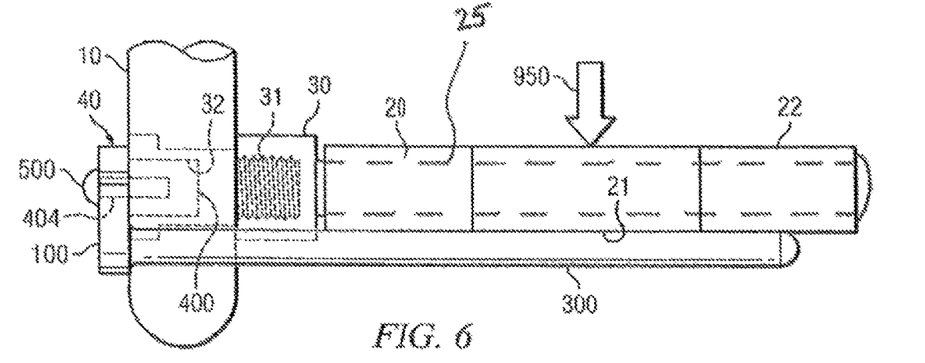
FIG. 6 is a side view of a preferred embodiment engaged with a crank arm and a pedal.

Referring to FIG. 6, pedal 20 is attached to crank arm 10 as is common in the art. For example, hub 30 is attached to crank arm 10 with fastener 31. Fastener 31 includes fastener hole 32. The cross-section of fastener hole 32 can be of many different shapes common in the art. Spindle 25 extends from hub 30. Pedal 20 is attached to spindle 25 and is free to rotate about the longitudinal axis of spindle 25 via bearings. In this example of a common pedal, hub 30, fastener 31, fastener hole 32, and spindle 25 are fixed relative to crank arm 10. In other examples of common in the art pedals, it is possible that the hub, fastener, fastener hole, and spindle or any combination thereof may rotate with respect to the crank arm. The construction of the pedal and how it is attached to the crank arm is not critical. The only requirement for operation of the device is that the pedal is free to rotate with respect to the crank arm as is the case with all bicycle pedals common in the art.

Positioner 40 is engaged with fastener hole 32 and pedal 20. Pedal 20 includes bottom surface 21 and top surface 22. Mounting post 400 is frictionally engaged with fastener hole 32. Pin 500 is frictionally engaged with hole 404 expanding mounting post 400 to secure positioner 40 in fastener hole 32. Prong 200 and prong 300 extend past crank arm 10 and engage pedal 20 at bottom surface 21. It is possible that only one of prongs 200 or 300 engage the pedal.

It is understood that bicycle pedals can be constructed in many different ways common in the art. The pedal positioning device disclosed operates equally well with many forms of bicycle pedals as long as the pedal is free to rotate around an axis extending from the crank arm and positioning of the pedal is desired.

Figure 7:
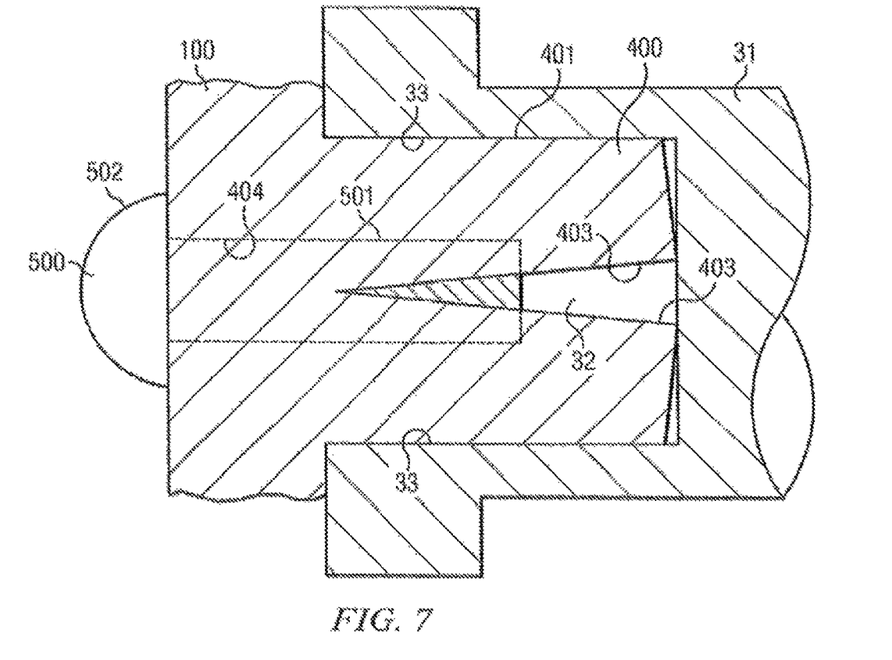
FIG. 7 is a partial section view of a pin engaged with a mounting post in a hole in a fastener.

Referring to FIG. 7, pin 500 has shaft 501 and flange 502. Mounting post 400 is connected to bridge 100. Fastener 31 includes fastener hole 32, having side surface 33. Mounting post 400 is inserted into fastener hole 32. Shaft 501 of pin 500 is inserted into hole 404 of mounting post 400, through bridge 100, to expand spaces 403, forcing outside surface 401 of mounting post 400 to frictionally engage side 33 of fastener hole 32. When engaged, flange 502 is flush with bridge 100.

Figure 13:
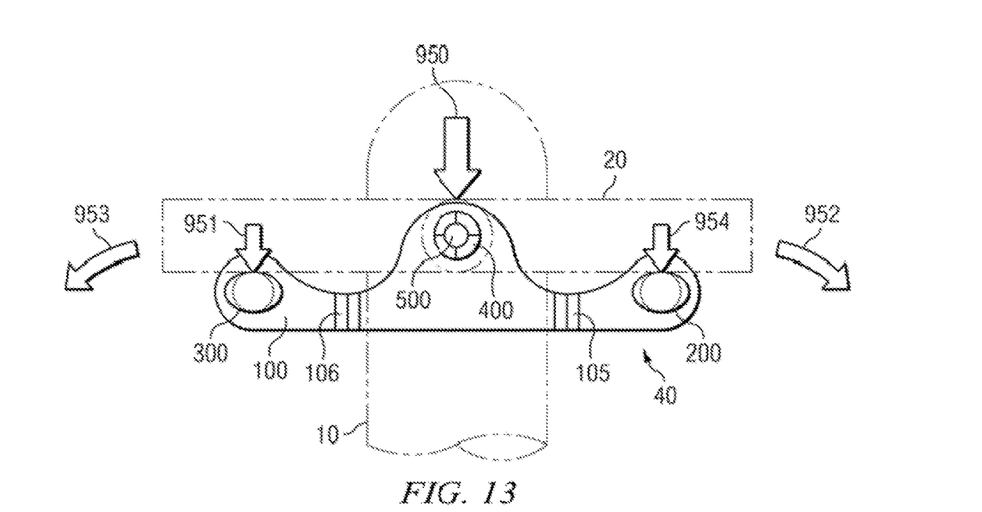
FIG. 13 is an end view of a preferred embodiment engaged with a crank arm and a pedal.

Referring to FIG. 13 in use, positioner 40 orients the pedal regardless of the position of the crank arm. With the positioner frictionally engaged with the fastener hole and at least one prong engaged with the pedal, a user manually orients the positioner such that the positioner directs the pedal to a desired beginning position. The frictional engagement of the mounting post with the fastener hole is sufficient to prevent rotation of the pedal when the user's foot is not applying a force to the pedal, thus the positioner fixes the orientation of the pedal with respect to the crank arm at the beginning position. Typically, the user prefers the pedal to begin in a generally horizontal position so that quick engagement of the pedal by the user's shoe can be accomplished, but other positions are possible. From the beginning position, force 950 is applied to pedal 20 sufficient to rotate crank arm 10 in direction 952 or direction 953. Force 950 is the force applied by the foot of the user to the pedal. Although force 950 is depicted as 0° from vertical, in actuality, force 950 can deviate from vertical in either direction in order to commence rotation of the crank arm.

As the crank arm rotates, pedal 20 rotates about the longitudinal axis of spindle 25. Because the user's foot is engaged with the pedal, while pedal 20 rotates about spindle 25, pedal 20 generally maintains a generally horizontal orientation. As pedal 20 rotates, pedal 20 applies shear force 954 on prong 200 or shear force 951 on prong 300 depending on the rotational direction of pedal 20.

Four different outcomes may occur as a result of the rotation of pedal 20. First, shear forces 951 or 954 may force the disengagement of the positioner from the fastener hole, resulting in the positioner falling harmlessly away from the user's bicycle to be retrieved later for future use. Second, shear forces 951 or 954 may fracture bridge 100 at notches 106 or 105, respectively, effectively severing prongs 300 or 200 from mounting post 400. Third, as pedal 20 rotates, shear forces 951 or 954 may urge prong 300 or prong 200, respectively, to contact crank arm 10 and force the disengagement of the positioner from the fastener hole, resulting in the positioner falling harmlessly away from the user's bicycle to be retrieved later for future use. Lastly, as pedal 20 rotates, shear forces 951 or 954 may urge prong 300 or prong 200 to contact crank arm 10 and fracture bridge 100 at notches 106 or 105, respectively, effectively severing prongs 300 or 200 from mounting post 400. In each scenario, once the positioner is disengaged from the fastener hole or the prongs have been severed, pedal 20 is then free to rotate about the longitudinal axis of spindle 25 continuously as the crank arm rotates repeatedly.

Figure 14A:
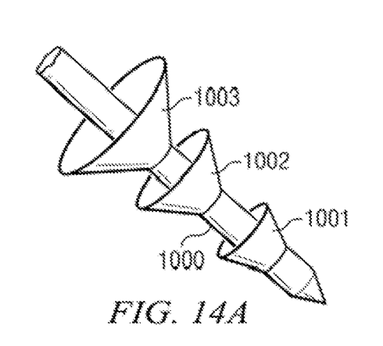
FIGS. 14A, 14B, and 14C are perspective views of various mounting post embodiments.
Figure 14B:
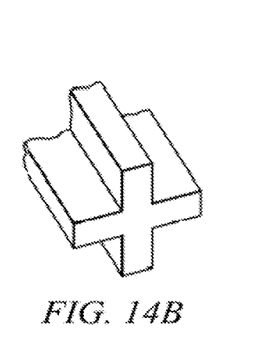
Figure 14C:
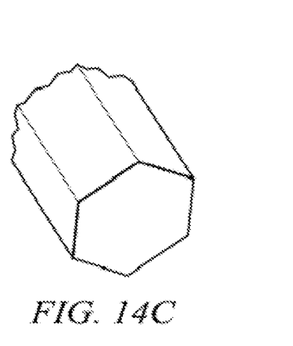

Referring to FIGS. 14A, 14B, and 14C, mounting post 400 in various alternate embodiments is shaped to generally match different holes in different fasteners. These shapes can include, but are not limited to, fasteners accepting a driver having a Phillips head, as shown in FIG. 14B, or a hexagonal head, as shown in FIG. 14C, or a spanner head. Alternatively, a universal insert post 1000 may also be employed to adapt to various hole diameters and cross-sectional shapes. In this embodiment, insert post 1000 includes flexible frustoconical shrouds 1001, 1002 and 1003 of gradiated diameter. The shrouds plastically deform and frictionally engage the interior surface of holes of varying shape and diameter, thereby adapting easily.

Figure 8A:
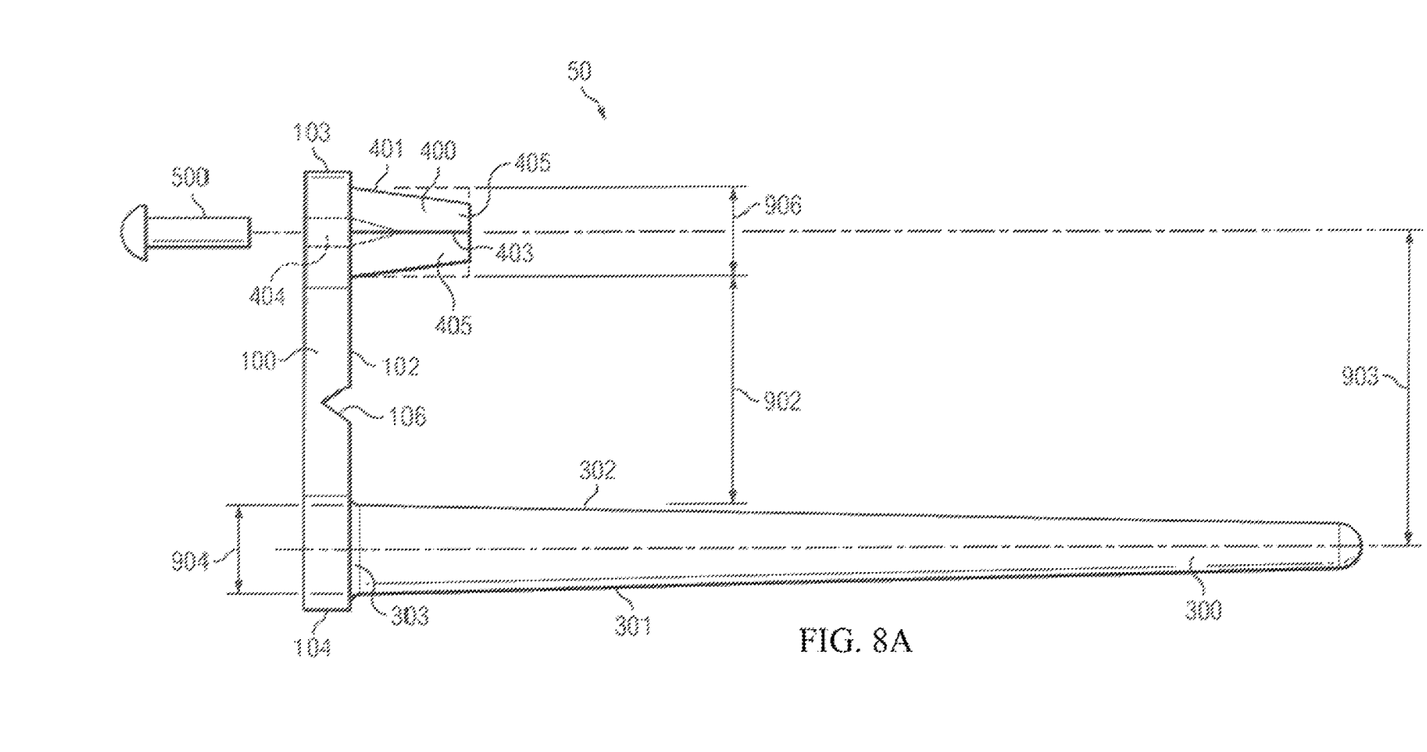
FIG. 8A is a top view of a preferred embodiment.
Figure 8B:
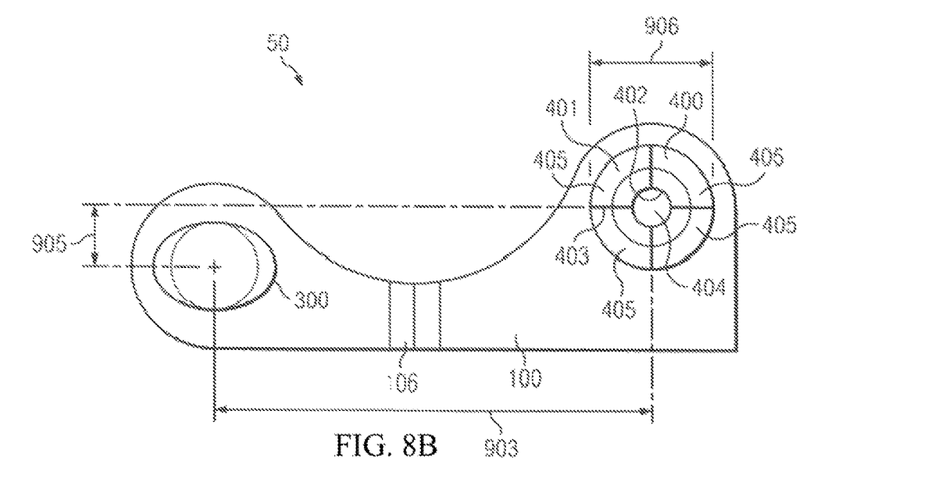
FIG. 8B is an end view of a preferred embodiment.

Referring to FIGS. 8A and 8B, positioner 50 comprises bridge 100 connected to prong 300 and connected to mounting post 400. Prong 300 has outside surface 301, inside surface 302, and base 303. Mounting post 400 has outside surface 401 and hole 404. Bridge 100 has inside surface 102, first end 103, second end 104, and notch 106. Distance 902 between outside surface 401 of mounting post 400 and inside surface 302 of prong 300 positions prong 300 to orient a pedal while mounting post 400 is inserted into a hole in a fastener of a crank arm. Mounting post 400 has width 906 which is sufficient to be inserted into a hole in a fastener. Base 303 has width 904. The central axis of mounting post 400 and the central axis of prong 300 are separated by distances 903 and 905. When mounting post 4100 is engaged with the fastener of the crank arm, prong 300 may or may not contact the crank arm and extends past the crank arm to engage a pedal. Pin 500 is inserted into hole 404 in mounting post 400 to secure positioner 50.

Mounting post 400 has a generally frustoconical shape and is divided into multifurcated sections 405. In this embodiment, pin 500 is used to secure the positioner in a hole of a fastener. In this embodiment, base 303 has width 904 that is sufficient to allow prong 300 to be broken when in use. In this embodiment, bridge 100 has notch 106 to facilitate the severance of prong 300 from bridge 100.

Figure 9A:
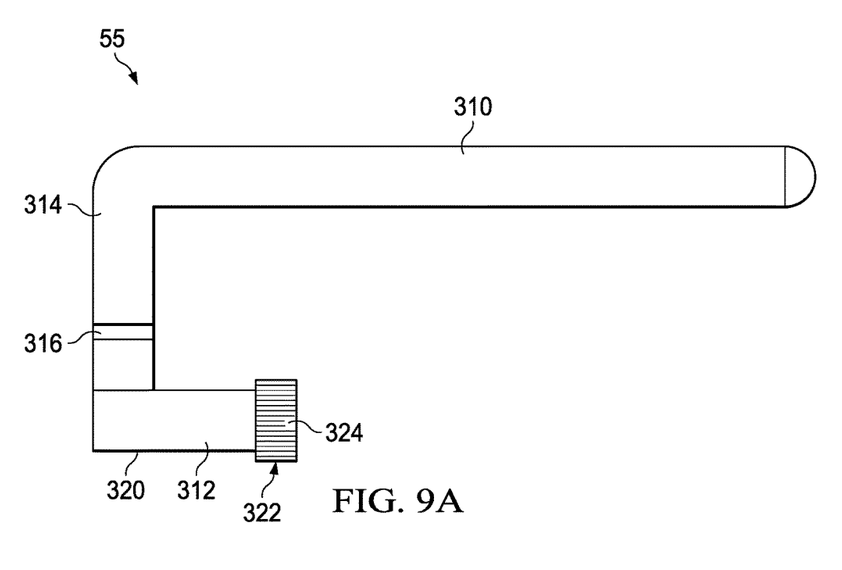
FIG. 9A is a top view of a preferred embodiment.
Figure 9B:
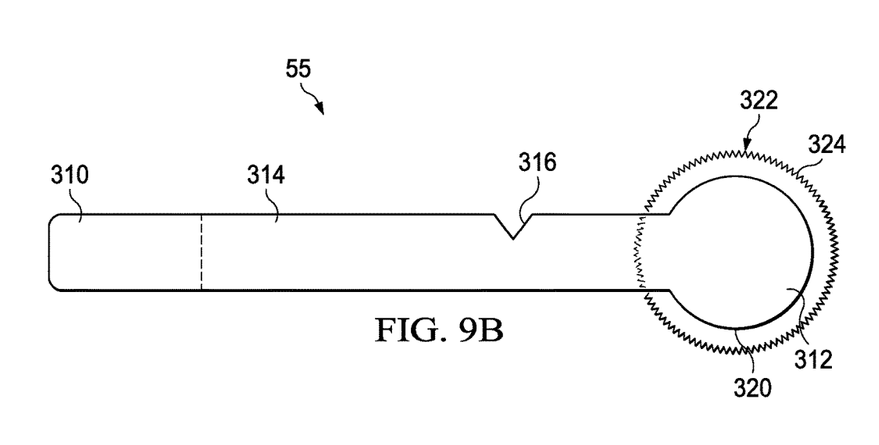
FIG. 9B is an end view of a preferred embodiment.

Referring to FIGS. 9A and 9B, pedal positioner 55 comprises bridge 314 connected to prong 310 and connected to mounting post 312. Prong 310 extends from bridge 314 generally perpendicularly but is not limited to 90 degrees as any angle ranging from 30 to 90 degrees would suffice. Mounting post 312 extends from bridge 314. Mounting post 312 includes shaft 320. Shaft 320 includes into head section 322. The exterior surface of head section 322 includes knurling 324. Proximate mounting post 312 along bridge 314 is notch 316. Notch 316 is a portion removed from bridge 314 to facilitate the severing of the prong from the mounting post during use.

In use, mounting post 312 is frictionally engaged with the fastener hole. Prong 310 extends past the crank arm and is engaged with the pedal. The frictional engagement of the mounting post with the fastener hole is sufficient to prevent rotation of the pedal when the user's foot is not applying a force to the pedal, thus the positioner fixes the orientation of the pedal with respect to the crank arm at a beginning position. From the beginning position, the user applies a force to the pedal sufficient to rotate the crank arm. As the pedal rotates, the pedal applies a shear force on the prong causing the mounting post to disengage from the fastener hole or fracturing the bridge thus separating the prong from the mounting post.

Figure 10:
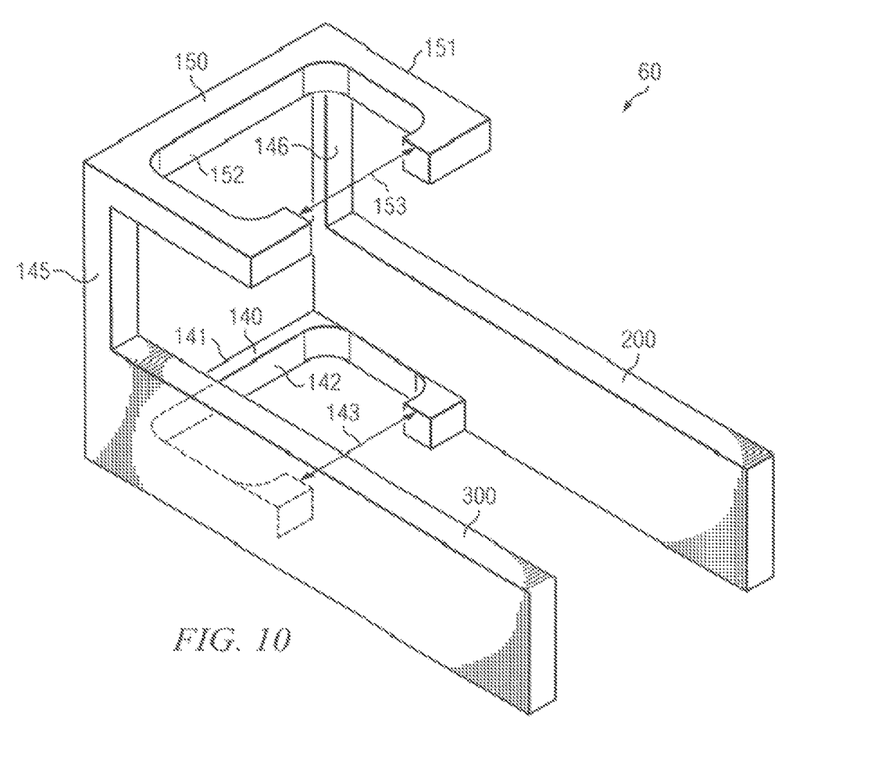
FIG. 10 is a perspective view of a preferred embodiment.
Figure 11:
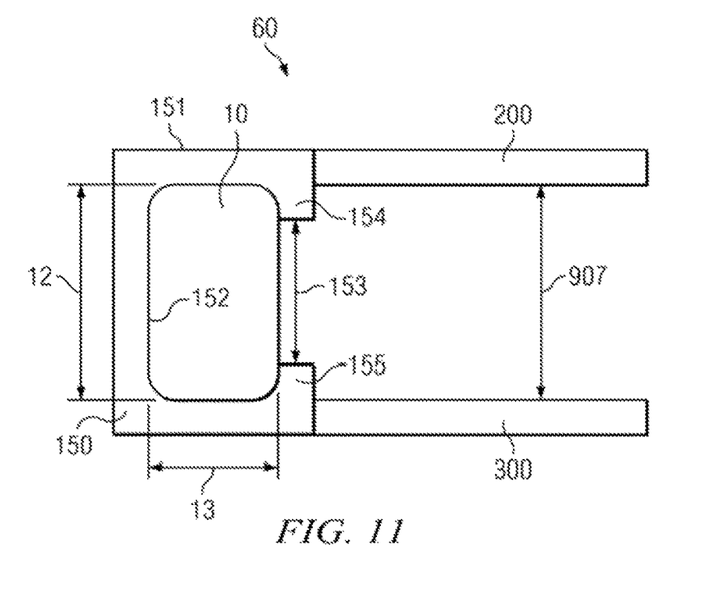
FIG. 11 is a top view of a preferred embodiment.

Referring to FIGS. 10 and 11, positioner 60 comprises flexible clamp 140, extension 145, extension 146, flexible clamp 150, prong 200, and prong 300. Extensions 145 and 146 are attached to clamp 140, extend from clamp 140 in a generally vertical direction, and are attached to flexible clamp 150. Prong 200 extends in a generally horizontal direction from extension 146. Prong 300 extends in a generally horizontal direction from extension 145. Flexible clamp 140 has outside surface 141, inside surface 142, and space 143. Flexible clamp 150 has outside surface 151 and inside surface 152, and space 153. Inside surface 152 is sufficient to surround a crank arm and to frictionally position clamp 150 on a crank arm. Likewise, inside surface 142 is sufficient to surround a crank arm and to frictionally position flexible clamp 140 on a crank arm.

Crank arm 10 has width 12 and thickness 13. Inside surface 152 surrounds crank arm 10 to frictionally position clamp 150 on crank arm 10. Prongs 200 and 300 extend to position a pedal. Prongs 200 and 300 are separated by distance 907, which is sufficient to enable prong 200 and prong 300 to engage a pedal.

Figure 12A:
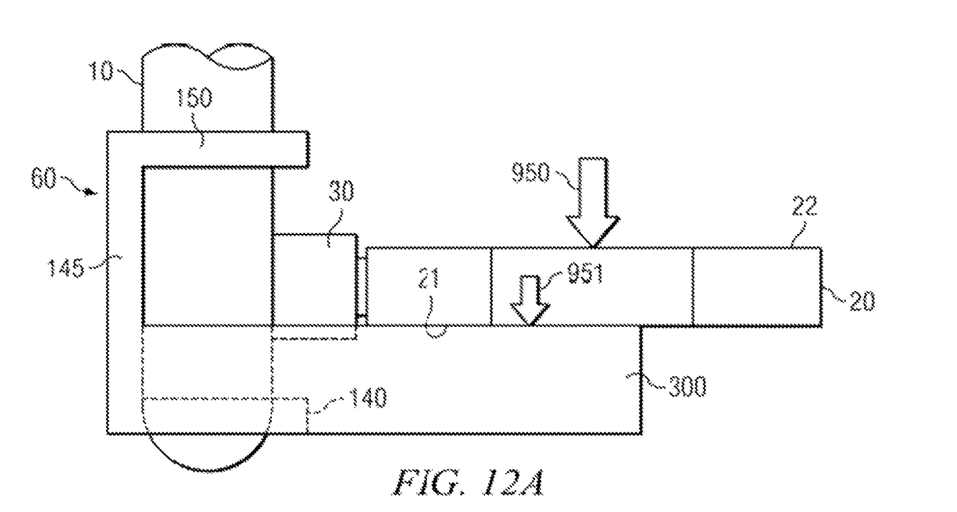
FIG. 12A is a side view of a preferred embodiment engaged with a crank arm and a pedal.
Figure 12B:
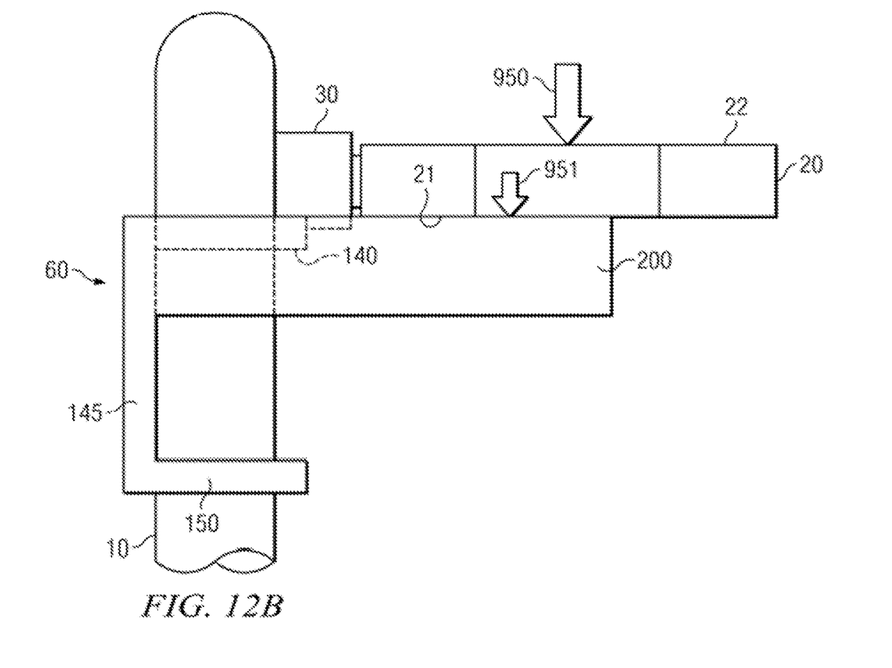
FIG. 12B is a side view of a preferred embodiment engaged with a crank arm and a pedal.

Referring to FIGS. 12A and 12B, positioner 60 is engaged with crank arm 10 and positioning pedal 20 in a generally horizontal position. FIG. 12A depicts the pedal at a bottom dead center position. FIG. 12B depicts the pedal at a top dead center position. Pedal 20 has top surface 22 and bottom surface 21. Flexible clamp 140 and flexible clamp 150 are frictionally positioned on crank arm 10, separated by extension 145, allowing prong 200 and prong 300 to extend in a generally horizontal direction to locate pedal 20 in a generally horizontal position.

Flexible clamps 140 and 150 are constructed of a material which allows plastic deformation. Flexible clamps 140 and 150 are flexibly deformed to be positioned on crank arm 10. Upon returning to original shape, flexible clamp 140 and flexible clamp 150 releasably grip crank arm 10. Those skilled in the art will appreciate that flexible clamp 140 and flexible clamp 150 can assume a multitude of shapes to suitably grip crank arm 10. Those skilled in the art will appreciate that prongs 200 and 300 can be positioned to extend from a multitude of locations between flexible clamps 140 and 150 on extensions 145 and 146.

In use, positioner 60 is placed into a holding position whereby at least one prong engages the pedal holding the pedal, in a generally horizontal position, in use, force 950 is applied to top surface 22 of pedal 20, and force 951 is applied to prongs 200 and 300. Crank arm 10 rotates in direction 952 or direction 953. Pedal 20 rotates about a longitudinal axis extending from crank arm 10. The rotation of pedal 20 applies shear force 954 on prong 200, bending it, but not severing it. Opposite rotation of pedal 20 applies shear force 951 on prong 300, bending it, but not severing it. As crank arm 10 continues to rotate, shear force 951 or 954 causes the positioner to bend causing the positioner to disengage from and fall from crank arm 10.

Figure 15:
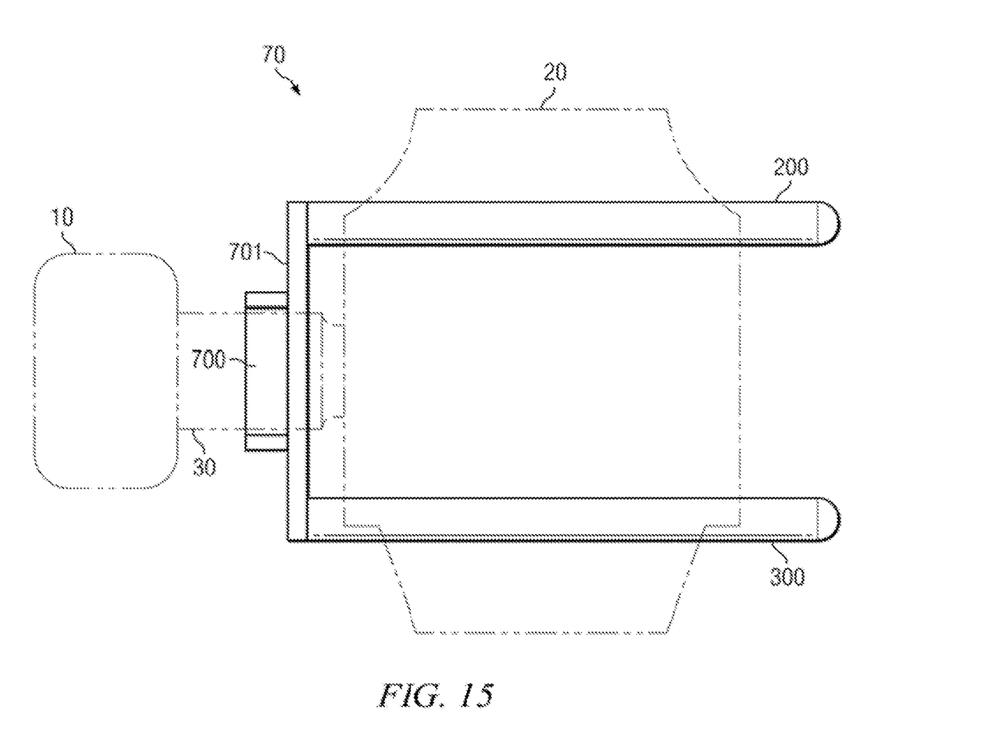
FIG. 15 is a top view of a preferred embodiment engaged with a bushing and a pedal.
Figure 16A:
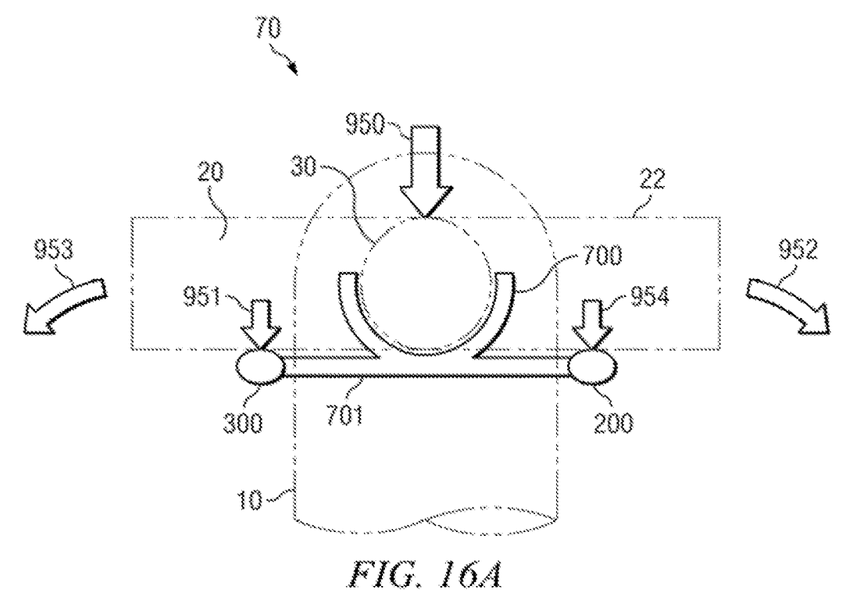
FIG. 16A is an end view of a preferred embodiment engaged with a bushing and a pedal.
Figure 16B:
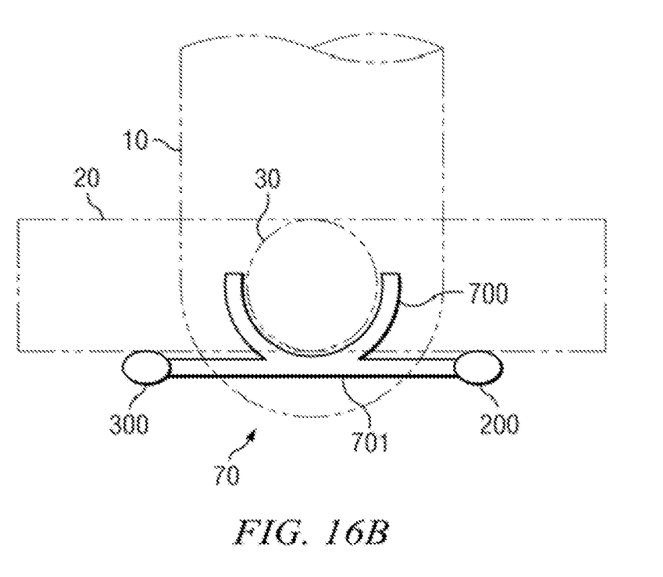
FIG. 16B is an end view of a preferred embodiment engaged with a bushing and a pedal.

Referring to FIGS. 15, 16A, and 16B, positioner 70 is engaged with hub 30 and positioning pedal 20 in a generally horizontal position. FIGS. 15 and 16A depict the pedal at a top dead center position. FIG. 163 depicts the pedal at a bottom dead center position. Positioner 70 comprises flexible clamp 700, prong bridge 701, prong 200, and prong 300. Flexible clamp 700 is frictionally positioned on hub 30 allowing prong 200 and prong 300 to extend from prong bridge 701 in a generally horizontal direction to locate pedal 20 in a generally horizontal position.

Flexible clamp 700 is constructed of a material which allows plastic deformation. Flexible clamp 700 is flexibly deformed to be positioned on hub 30. Upon returning to original shape, flexible clamp 700 releasably grips hub 30. Those skilled in the art will appreciate that flexible clamp 700 can assume a multitude of shapes to suitably grip hub 30.

In use, positioner 70 is placed into a position whereby at least one prong engages a pedal, thereby fixing a pedal in a generally horizontal position. Force 950 is applied to top surface 22 of pedal 20, and forces 951 and 954 are applied to prongs 200 and 300. If force 950 is added to pedal 20 sufficient to rotate crank arm 10 in direction 952 or direction 953, pedal 20 rotates about an axis that is generally perpendicular to crank arm 10. The rotation of pedal 20 applies shear force 951 or 954, respectively, on prong 200, thereby severing prongs 200 or 300. The widths of prong 200 and prong 300 are sufficient to allow shear forces 951 and 954 to sever prong 200 and prong 300.

Each of the embodiments disclosed can be constructed of plastic or any suitable material through any suitable manufacturing technique. In one embodiment, the material chosen will allow the prongs to be fractured and discarded after use. In these embodiments, the material should be more brittle. In another embodiment, the material chosen will allow the prongs to bend, but not break, allowing the positioner to be reused. In these embodiments, the material should be more flexible. The positioner can also be made of a material that is disposable, biodegradable, and/or compostable. Examples are cardboard or a biomass plastic (such as cornstarch).

It will be appreciated by those skilled in the art that modifications can be made to the embodiments disclosed and remain within the inventive concept. Therefore, this invention is not limited to the specific embodiments disclosed, but is intended to cover changes within the scope and spirit of the claims.

The invention claimed is:

1. A positioner for positioning a pedal attached to a crank arm comprising:
   a mounting post, for attaching the positioner to the crank arm, engaged with the crank arm;
   at least one prong supported by the mounting post and adjacent the pedal;
   wherein rotation of the pedal disengages the mounting post from the crank arm; and
   wherein rotation of the pedal creates a shear force on the at least one prong.

2. The positioner of claim 1 wherein rotation of the pedal severs the at least one prong from the mounting post.

3. The positioner of claim 1 further comprising:
   a fastener attaching the pedal to the crank arm;
   a fastener hole in the fastener; and,
   the mounting post frictionally engaged with the fastener hole.

4. The positioner of claim 1, wherein the mounting post further comprises:
   a bridge;
   a mounting post attached to the bridge; and,
   the at least one prong extending from the bridge.

5. The positioner of claim 4, wherein the mounting post extends from the bridge, and engages a hole fixed with respect to the crank arm.

6. The positioner of claim 5, wherein the hole has a first cross-sectional shape and the mounting post has a second cross-sectional shape and wherein the first cross-sectional shape matches the second cross-sectional shape.

7. The positioner of claim 4 further comprising:
   a break-away notch in the bridge and adjacent the at least one prong.

8. The positioner of claim 7 further comprising:
wherein rotation of the pedal urges the at least one prong to contact the crank arm and the bridge fractures at the break-away notch.

9. The positioner of claim 1, wherein the mounting post further comprises:
at least one clamp.

10. The positioner of claim 9, further comprising:
at least one extension attached to the at least one clamp;
the at least one prong attached to the at least one extension; and,
the at least one clamp frictionally engaging the crank arm.

11. A pedal positioning device for releasable engagement with a crank arm connected to a bicycle pedal comprising:
a mounting post frictionally engaged with the crank arm;
a bridge attached to the mounting post;
a prong extending from the bridge; and,
wherein rotation of the pedal initiates a shear force on the prong that causes disengagement of at least a portion of pedal positioning device from the crank arm.

12. The pedal positioning device of claim 11 further comprising:
a notch in the bridge; and,
wherein rotation of the pedal fractures the bridge at the notch.

13. A method for temporarily positioning a pedal attached to a crank arm comprising the steps of:
providing a pedal positioner comprising a mounting post and at least one prong attached to the mounting post;
mounting the pedal positioner on the crank arm and adjacent the pedal;
positioning the pedal to a beginning position;
applying a force to the pedal sufficient to rotate the crank arm;
rotating the pedal about a longitudinal axis extending from the crank arm;
dismounting the pedal positioner from the crank arm;
initiating a shear force on the at least one prong; and,
forcing the disengagement of at least a portion of the pedal positioner from the crank arm.

14. The method of claim 13 further comprising:
initiating a shear force on the at least one prong; and,
severing the at least one prong from the mounting post.

* * * * *